Dec. 4, 1945.       R. POOLE       2,390,384
WIND INDICATOR
Filed Aug. 15, 1944       2 Sheets-Sheet 1
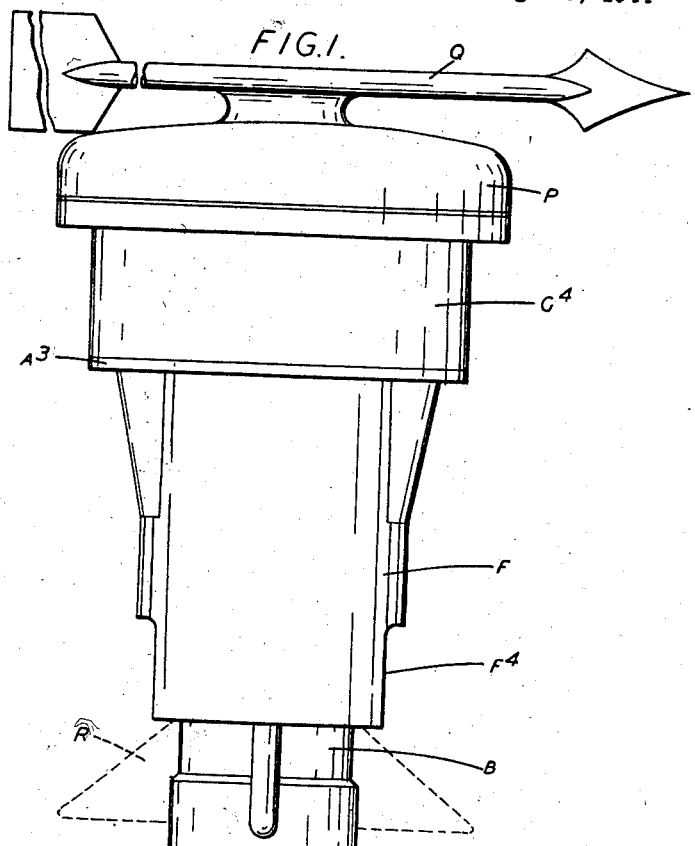
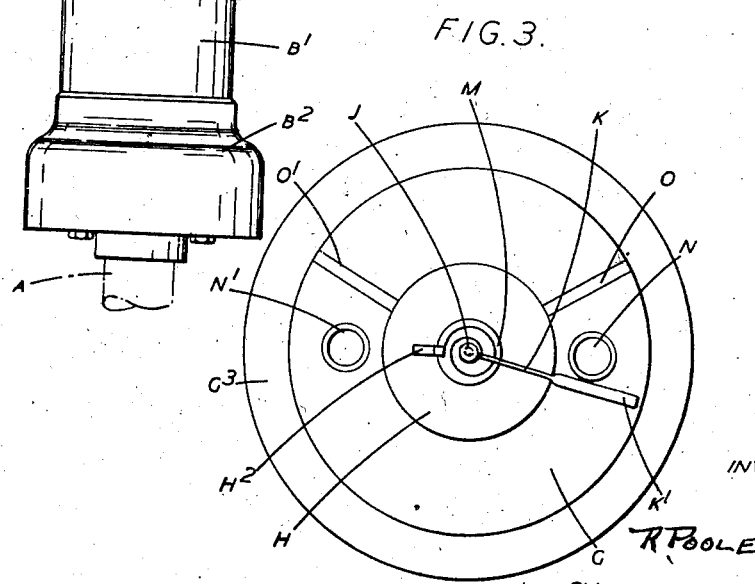
INVENTOR
R. POOLE
BY
Curry Holcomb & Blair
ATTORNEYS Dec. 4, 1945.  R. POOLE  2,390,384
WIND INDICATOR
Filed Aug. 15, 1944  2 Sheets-Sheet 2

INVENTOR
R. Poole
BY
ATTORNEYS

Patented Dec. 4, 1945

2,390,384

UNITED STATES PATENT OFFICE 2,390,384

WIND INDICATOR

Ralph Poole, London, England

Application August 15, 1944, Serial No. 549,551
In Great Britain June 28, 1943

6 Claims. (Cl. 73—189)

This invention relates to wind indicators and has for its object to provide an apparatus which will provide indications of wind speed and direction at a place which may be some distance from the point where the measurement is actually taken. The apparatus is designed to be particularly sensitive in order to indicate gusts of greater or lesser degree.

The apparatus according to this invention comprises in combination a head which is freely rotatable on a fixed support, means for maintaining this head oriented in relation to the direction of the wind, a chamber in this head containing a vane or the like which can be deflected against a spring by the pressure thereon of the wind as it flows through the chamber, means for indicating the deflections of the vane in the chamber, and means for indicating the movements of the whole head about its axis on the fixed support. The chamber in the head which contains the vane is conveniently formed annular and the vane is mounted so that it lies radially across this chamber in which it can swing around in the chamber about its centre against the action of a spring. Two passages in a part of the head below the annular chamber lead in a vertical direction into that chamber these passages being positioned diametrically opposite with respect to the axis of the head and with their lower ends open for the entry and outflow of air. The head may be constituted by an externally cylindrical member forming an inner casing rotatably mounted on a rigid vertical support. There is an outer cylindrical casing which carries on its exterior a radially projecting wind vane of suitable type which will serve to keep the head with the inlet to the chamber therein facing to the wind. This outer casing is fixed on the rotatable member, but being of larger diameter is spaced apart radially so as to provide between these two parts an annular channel which is open at its lower end and leads up through openings into an annular chamber which is otherwise closed in. Two radial partitions divide the annular channel into two passages through which air can flow into and return from the annular chamber. In this chamber is a vane which may conveniently be a plate mounted on an arm rotatable about the centre of the chamber against the action of a suitably disposed spring. The vane thus extends in the radial direction across the chamber and will be deflected by the pressure of air flowing through the chamber by way of the longitudinal passages.

The deflections of the vane in the chamber indicative of the wind speed, and the movements of the whole head about its vertical axis indicative of wind direction are respectively transmitted and indicated by a suitable type of step-by-step electrical transmitter as for instance one which is commonly known as of the Selsyn type. These indications may be thus transmitted to a place situated at some distance from the apparatus which is subject to the action of the wind.

In its constructional details the apparatus may vary, but the accompanying drawings illustrate by way of example a construction which may be used in carrying the invention into practice. In these drawings, Figure 1 is an elevation showing the external appearance of the apparatus.

Figure 3 is a sectional plan on the line 3—3 in Figure 2 looking in the direction of the arrows and thus in effect showing the annular chamber with the swinging vane therein as seen after removal of the top of the casing or cover.

The rotatable indicating head is mounted conveniently on ball bearings, on the end of a mast or the like of suitable height and construction. Preferably a steel tubular mast A is employed within which can be carried down the cable for the current from the transmitters. The head is built up of or may be said to comprise three main parts namely an inner or main tubular casing, within which lies the upper end of the mast with the bearings and electrical connections, an outer casing of less length than the inner casing and of larger diameter, and the annular chamber which surrounds or is mounted on the upper end of the main casing. The main casing is constituted by a tube of suitable length conveniently formed in two parts B, B¹ in which and suitably spaced apart are the bearings C, C¹ interposed between this tube and the end of the mast A. The mast carries slip rings D and within the upper end at A¹ is the Selsyn generator associated with the electrical transmission of the rotational movements and position of the whole head in respect of the wind direction whereby an indication of the wind direction is given. It being obvious that the transmitting mechanism within the part A¹ is operated through the radial arm shown at the top of this part when the whole head of the apparatus rotates, there being a pin connection between the end of this radial arm and the rotating head as clearly shown in Fig. 2. The transmission system used may conveniently be that which is well-known as of the Selsyn type and may be designed to indicate only the cardinal points of the compass or successive angular positions differing by 45° or less. The lower end of the part $B^1$ of the tubular casing is protected against the entry of rain or snow by an arrangement of concentric cups $A^2$, $B^2$ on the fixed and rotating parts which leave the head full freedom for rotation. Openings $A^4$ are provided in the wall of the tubular mast A within the casing $B^1$ for draining the interior of the mast. As shown the Selsyn generator $A^1$ is mounted on the end of the mast A with the slip rings D below it and at the end of the mast are slip rings E for the transmission of the current indicating the wind speed by the swinging movements of the vane in the annular chamber.

Figure 2:
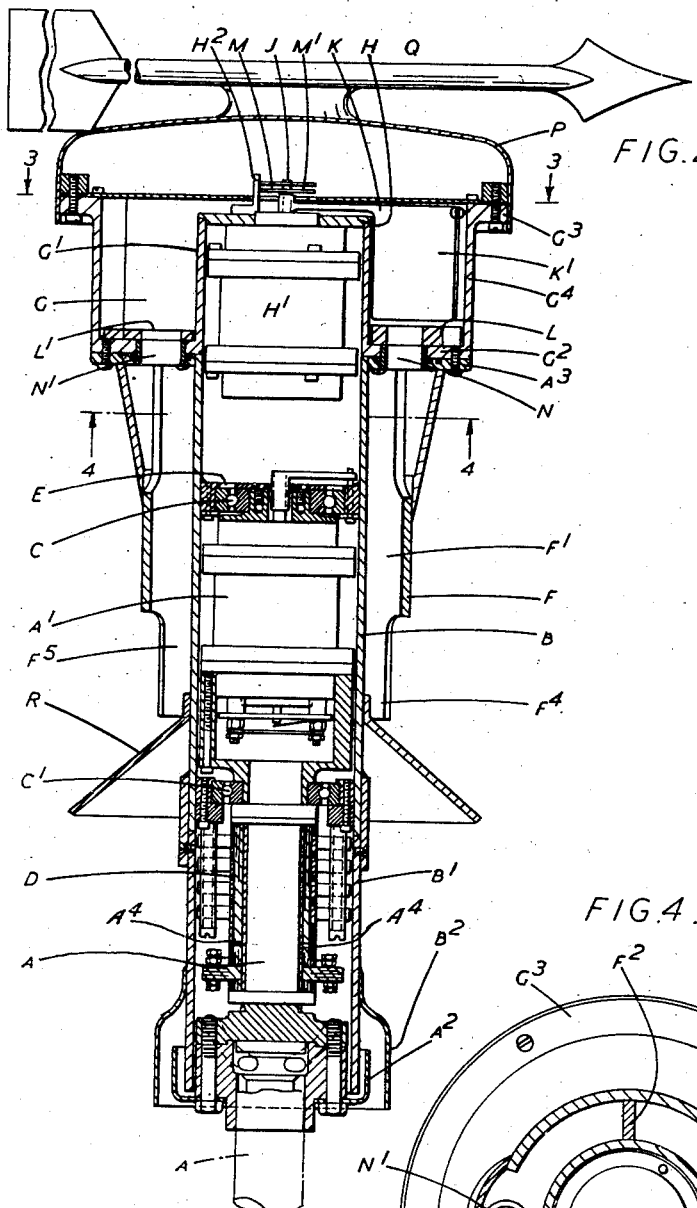
Figure 2 is a vertical section of the apparatus as seen in Figure 1 the section being substantially in the plane of the paper in Figure 1.

The outer casing F is tubular of appreciably less length than the main casing B, $B^1$ and has a greater diameter so that when in position and concentric with the main casing there will be between these casings an annular space $F^1$ of substantial radial width. The outer casing F extends downwards from a flange $A^3$ on the exterior of the upper end of the main casing and through which the latter is connected to the outer casing and this flange may form or has resting on and connected to it the bottom of the annular chamber G whose inner wall $G^1$ in effect constitutes an upward extension of the end of the main casing B. The space within this wall $G^1$ at its upper end is closed in by a plate H which carries on its under side the Selsyn generator $H^1$ associated with the electrical transmission of the swinging movements of the vane in the chamber. From the upper side of the plate H projects vertically the spindle J of the rotor of the Selsyn generator on which is fixed an arm K which carries this vane $K^1$ which conveniently is formed as a rectangular plate dependent from the swinging arm. In a radial section as seen in Figure 2 the annular chamber G is conveniently rectangular, but it is preferable to vary the area of this section so that while the end portion of the chamber extending from the air inlet approximates in its cross-sectional area to the area of the vane plate $K^1$, the end part adjacent to the air outlet has an increased area. The effect of this is to increase the sensitivity of the swinging vane to air flow through the chamber when this flow is at a lower velocity than when the air current is stronger. This results from there being less clearance for the passage of the air past the vane $K^1$ when the latter is in its zero position and while it is moving through the first part of its travel, than in the part of the chamber approaching the air outlet where the air can flow more freely past the vane. The variation in the area of the chamber may conveniently be effected by raising the floor $G^2$ of the chamber at the inlet end for a suitable distance, as by placing there a filling piece L of the necessary dimensions. At its end towards the outlet this filling piece, shown in dotted lines, is bevelled off or of less thickness as at $L^1$ so that the floor of the chamber will slope away and increase the clearance beneath the vane plate.

The arm K which carries the vane plate, or as in this case the spindle J of the rotor of the Selsyn generator is acted on by at least one spring of suitable type and so disposed as to tend to maintain the vane $K^1$ in its zero angular position from which it will be deflected by the wind entering and flowing through the annular chamber. A convenient arrangement is to provide two springs M, $M^1$ spaced apart along the rotor spindle J and coiled around it each spring having one end attached to the spindle and the other end fastened to an adjacent fixed part $H^2$. These springs may be of different strengths and incidentally may be insulated and used to convey electric current to the Selsyn generator. Of these two springs, when the vane is in its zero position, one is coiled to a greater extent than the other so that the neutral or zero point of one spring is spaced circumferentially from the neutral or zero point of the other spring. The arrangement has the effect that over the first part of the arc through which the vane swings the action of one spring will be negative, that is to say in opposition to the action of the second spring on the arm carrying the vane, and it will lessen the resistance offered by the second spring to the wind action on the vane. As the vane swings further, the first spring will become positive in its action thus increasing the resistance offered to the swinging of the vane by the increasing wind action. By this device the vane is made very sensitive to light air currents and readily responsive to fluctuations or gusts in light breezes. The scale of the indicator may thus be made an open one over the first part from its zero. This indicator may be merely a visual one with an arm moving over a scale, or it may be arranged to give a record as by means of a pen moving over a chart on a clock-driven drum. The indicator for the wind direction may be similarly only a visual one or it may be arranged to give a record. It may be convenient for records to be made on the same chart of both the wind direction and speed and in some cases it may be desirable to provide such recording apparatus as well as separate visible indicators with pointers moving over suitable scales.

Figure 4:
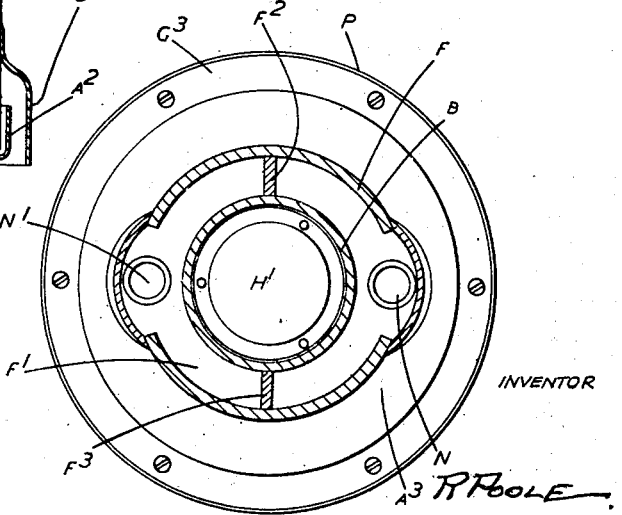
Figure 4 is a transverse section on the line 4—4 in Figure 2 looking in the direction of the arrows and thus giving an under-side view of the bottom of the casing containing the annular chamber.

The air flow to and from the annular chamber G takes place through the space $F^1$ between the inner casing B and the outer casing F and this space is divided longitudinally by two radial partitions $F^2$, $F^3$ (see Figure 4) situated diametrically opposite in the annular space $F^1$ between the casings so as to form two longitudinal channels or passages. At the upper end of each of these is an opening N, $N^1$ leading into the annular chamber G through the flange $A^3$ and the bottom $G^2$ of the chamber, and in the latter are two radial partitions O, $O^1$ (see Figure 3) arranged so as to shut off an arc of this chamber in which the swinging vane $K^1$ cannot move. By this means the air entering the chamber from one of the longitudinal passages $F^1$ N must act on the vane $K^1$ as it flows through the chamber G to the outlet passage $N^1$ and cause a deflection dependent on the velocity of this air flow. The variations in these deflections will result in indications being given of gusts as well as the general rate of wind flow. Conveniently a light and readily detachable cover P is fitted over the top of the head and suitably curved to throw off rain or snow. This cover is conveniently attached to an external flange $G^3$ at the top of the outer wall $G^4$ of the chamber G.

On the exterior of the head projects laterally a wind vane Q which ensures the rotational positioning of the head according to the direction of the wind.

In the lower end of the part of the outer casing which encloses the inflow passage for the wind there is a notch F⁴, preferably rectangular, which may be termed the inflow port. This port extends for a suitable distance in the longitudinal direction and in width, that is to say its circumferential dimension, is less than the diameter of the inner casing. A similar port F⁵ may be provided in the outer casing for the outflow of air, this port being in a position diametrically opposite to the inflow port F⁴. The external wind vane Q maintains the head with the inflow port F⁴ always facing the direction from which the wind is coming. The wind entering this port is directed upwards through the inflow channel N to the annular chamber G. This upward directioning may be assisted by a flared flange R which may be disposed around the inner casing a suitable distance below the lower end of the outer casing.

What I claim as my invention and desire to secure by Letters Patent is:

1. A wind indicator comprising in combination a fixed vertical support, a head freely rotatable on the upper end portion of this support, means operated automatically by the wind for maintaining this head oriented with respect to the direction of the wind, an annular chamber in this head across which extends at least one fixed partition, means providing openings through a wall of this chamber these openings being oppositely disposed in relation to the axis about which the head rotates so that wind can enter the chamber and after passing through it issue therefrom, a radial arm rotatable in this chamber about its centre and carrying a plate constituting a vane whose contour approximates to the cross-section of the chamber and extends radially across it, at least one spring operative on this vane-carrying arm and offering resistance to rotation of the arm by the pressure on the said vane of the wind flowing through the said annular chamber, means comprising a transmitter responsive to these angular deflections of the said vane in the chamber, and means comprising a transmitter responsive to the angular movements of the whole head in accordance with the wind direction.

2. A wind indicator comprising in combination a fixed vertical support, a head freely rotatable on the upper end portion of this support, means operated automatically by the wind for maintaining this head oriented with respect to the direction of the wind, an annular chamber in this head across which extends at least one fixed partition, means providing openings through a wall of this chamber these openings being oppositely disposed in relation to the axis about which the head rotates so that wind can enter the chamber and after passing through it issue therefrom, a radial arm rotatable in this chamber about its centre and carrying a plate constituting a vane whose contour approximates to the cross-section of the chamber and extends radially across it, at least one spring operative on this vane-carrying arm and offering resistance to rotation of the arm by the pressure on the said vane of the wind flowing through the said annular chamber, an electrical transmitter responsive to these angular deflections of the said vane in the chamber, and transmitter means responsive to the angular movements of the whole head in accordance with the wind direction.

3. A wind indicator comprising in combination a fixed vertical support, a head freely rotatable on the upper end portion of this support, means operated automatically by the wind for maintaining this head oriented with respect to the direction of the wind, an annular chamber in this head across which extends at least one fixed partition, means providing openings through a wall of this chamber these openings being oppositely disposed in relation to the axis about which the head rotates so that wind can enter the chamber and after passing through it issue therefrom, a radial arm rotatable in this chamber about its centre and carrying a plate constituting a vane whose contour approximates to the cross-section of the chamber and extends radially across it, at least one spring operative on this vane-carrying arm and offering resistance to rotation of the arm by the pressure on the said vane of the wind flowing through the said annular chamber, means for increasing the area of the clearance between the said plate vane and the walls of the said annular chamber as the vane is caused to swing by increasing pressure of the wind thereon, transmitter means responsive to these angular deflections of the said vane in the chamber, and transmitter means responsive to the angular movements of the whole head in accordance with the wind direction.

4. A wind indicator comprising in combination a fixed vertical support, a cylindrical casing freely rotatable on the upper end portion of the support, a closed annular chamber surrounding the upper end portion of this casing, at least one partition fixed radially in this chamber across it, means providing two openings through a wall of this chamber situated diametrically opposite with respect to the axis about which the casing is rotatable so that wind entering through one opening can pass around through the chamber and issue from the second opening, a radial arm rotatable in this chamber about the axis of the said casing, a plate constituting a vane carried by the radial arm so that it lies radially across the said annular chamber the contour of the plate approximating to the cross-section of the chamber around in which the plate can swing with the said arm, two passages each open at the end on the exterior of the said rotatable casing below the said annular chamber these passages being situated diametrically opposite with respect to the axis of the casing and each passage leading to one of the said openings through a wall of the said annular chamber, means operated automatically by the wind for maintaining the whole head formed by the said casing and annular chamber oriented with respect to the direction of the wind and so that the open end of one of the said passages on the exterior of the casing is directed towards the wind and the open end of the second passage is directed away from the wind, at least one spring operative on the said vane-carrying arm and offering resistance to rotation of the arm by the pressure on the said vane of the wind flowing through the said annular chamber, transmitter means responsive to these angular deflections of the vane in the said chamber, and transmitter means responsive to the angular movements of the whole head in accordance with the wind direction.

5. A wind indicator comprising in combination a fixed vertical support, a cylindrical casing freely rotatable on the upper end portion of the support, a closed annular chamber having a substantially rectangular cross-section this chamber surrounding the upper end portion of the casing around which the floor of the chamber lies as a flange, at least one partition fixed radially in this chamber across it, means providing two openings through the said flange-like floor of the chamber these openings serving respectively as inlet and outlet and being situated diametrically opposite with respect to the axis about which the casing is rotatable so that wind entering the chamber through one opening and owing to the said partition must pass around in one direction through the chamber to the second opening and there issue, a radial arm rotatable in this chamber about the axis of the said casing, a plate constituting a vane carried by the radial arm so that it lies radially across the chamber between the said openings through the floor of the chamber the contour of the plate being rectangular and approximating to the cross-sectional area of the said chamber adjacent to the said inlet opening in the floor, at least one spring operative on the vane-carrying arm and offering resistance to rotation of the arm by the pressure of the wind acting on the vane as it flows through the annular chamber, a cylindrical outer casing of larger diameter than and concentric with the said inner rotatable casing this outer casing being attached to and dependent from the said flange below the said annular chamber, two oppositely situated radial partitions each extending across the annular space between the inner and outer casings and thereby dividing this space which is open below into two passages on the exterior of the inner casing which lead respectively to the said two openings in the floor of the said annular chamber, means operated automatically by the wind for maintaining the whole head formed by the said inner and outer casings and the annular chamber oriented with respect to the direction of the wind and so that the open end of one of the said passages between the inner and outer casings is directed towards the wind and the open end of the second passage is directed away from the wind, transmitter means responsive to the angular deflections of the vane in the said annular chamber, and transmitter means responsive to the angular movements of the whole head in accordance with the wind direction.

6. A wind indicator comprising in combination the features set out in claim 5 and having in the wall of the said cylindrical outer casing two openings each extending from its lower edge and adapted respectively for the entry and outflow of the wind into and from the said passages formed between the inner and outer casings.

RALPH POOLE.